United States Patent [19]
Doan

[11] Patent Number: 5,703,446
[45] Date of Patent: Dec. 30, 1997

[54] METHOD AND APPARATUS FOR CONTROLLING THE OSCILLATORY MOTION OF A TEST DEVICE

[75] Inventor: Tien D. Doan, Peoria, Ill.

[73] Assignee: Caterpillar Inc., Peoria, Ill.

[21] Appl. No.: 650,254

[22] Filed: May 22, 1996

[51] Int. Cl.⁶ .............................. H02K 33/00; G01M 7/00
[52] U.S. Cl. ............................. 318/119; 73/578; 318/114
[58] Field of Search ..................................... 331/1 R, 182, 331/183; 318/114, 119, 560, 610; 324/76.77, 76.78

[56] References Cited

U.S. PATENT DOCUMENTS

| | | | |
|---|---|---|---|
| 3,442,120 | 5/1969 | Russenberger | 73/92 |
| 3,508,159 | 4/1970 | Marpe | 327/306 |
| 3,772,913 | 11/1973 | Zell et al. | 73/67.2 |
| 4,445,779 | 5/1984 | Johnson | 356/350 |
| 4,539,845 | 9/1985 | Molinar | 73/578 |
| 5,124,626 | 6/1992 | Thoen | 318/610 |
| 5,192,917 | 3/1993 | Schweigert et al. | 327/50 |
| 5,223,778 | 6/1993 | Svarovsky et al. | 318/610 |

*Primary Examiner*—Steven L. Stephan
*Assistant Examiner*—Judson H. Jones
*Attorney, Agent, or Firm*—James R. Yee

[57] ABSTRACT

A method and apparatus for controlling the oscillatory motion of a test device by using amplitude and DC offset feedback for control purposes. The force applied to the test device is monitored by a load sensor and compared to a preset desired amplitude load setpoint to determine the positive peak amplitude of a sinusoidal control signal. The DC offset feedback is monitored by sampling the value of a displacement feedback signal a number of times for each cycle of movement. The values of the samples are averaged to determine a calculated DC offset. The calculated DC offset is compared to a desired DC offset, which is determined from a preset desired displacement setpoint. The difference between the calculated DC offset and the desired DC offset is then used to control the load applied to the test device to maintain the desired oscillatory movement.

15 Claims, 3 Drawing Sheets

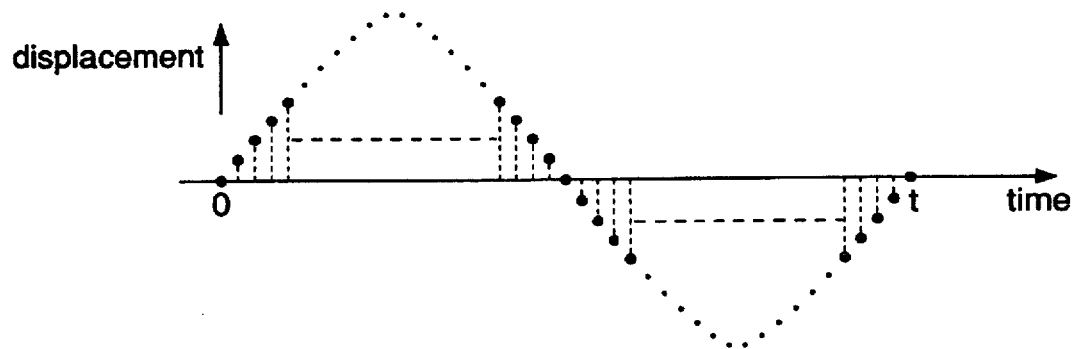
Fig_2a_
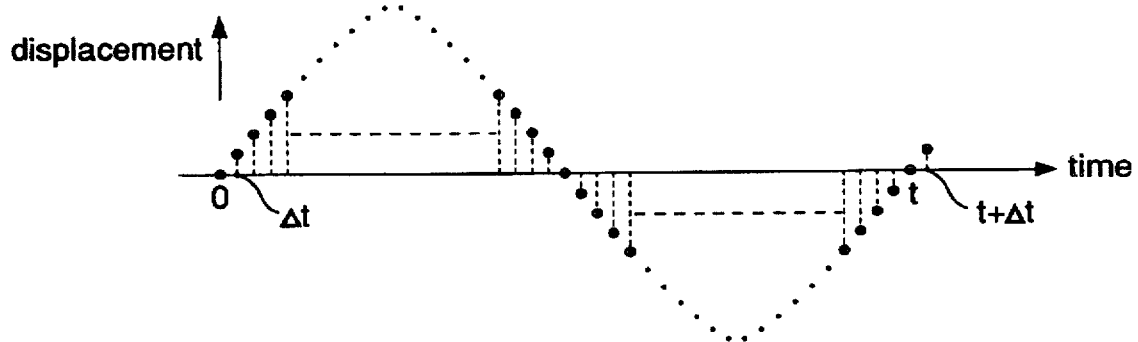
Fig_2b_

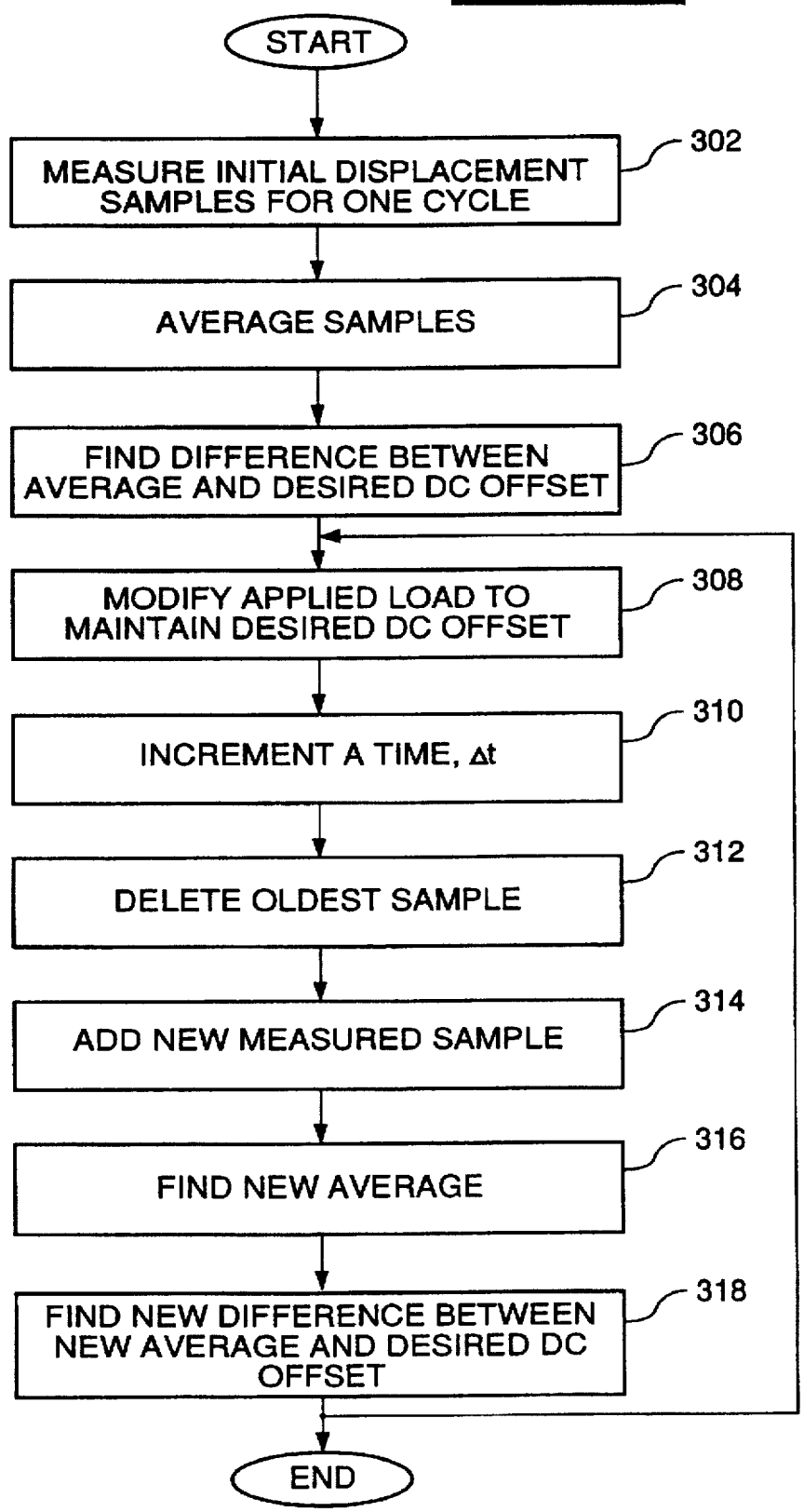

METHOD AND APPARATUS FOR CONTROLLING THE OSCILLATORY MOTION OF A TEST DEVICE

TECHNICAL FIELD

This invention relates generally to a method and apparatus for controlling the motion of a test device and more particularly to a method and apparatus using amplitude and DC offset feedback to control the oscillatory motion of a test device.

BACKGROUND ART

Systems that apply forces to cause test devices to move in an oscillatory manner are well known in the art. The repetitive motion applied may be used for long-term fatigue testing on a device, for example.

The types of forces applied (e.g., compression, expansion, or twisting) cause the device under test to create new reactive forces, similar to the energy stored and dissipated when a spring is compressed and released. These reactive forces, if not controlled, cause the initial oscillatory motion to behave in a nonlinear manner.

In the prior art, control systems have been developed which respond to elements of the oscillation, such as amplitude and phase, and generate control signals to maintain linear oscillatory motion.

For example, in U.S. Pat. No. 5,124,6245, Thoen discloses a feedback control system which compares the peaks and zero crossings of a command signal and a feedback signal that have been offset in phase with each other by 90 degrees in order to control the amplitude and phase of the command signal.

As another example, in U.S. Pat. No. 5,192,917, Schweigert et al disclose another feedback control system in which two sinusoidal signals that are offset from each other by 90 degrees are compared at their peaks and zero crossings to determine amplitude and DC offset deviations.

These control systems only monitor the motion during one or two positions each cycle (e.g., amplitude during peaks, phase during zero crossings). The remaining portions of each cycle of motion are not monitored or controlled.

The present invention is directed to overcoming one or more of the problems as set forth above.

DISCLOSURE OF THE INVENTION

In one aspect of the present invention an apparatus for controlling the oscillatory motion of a device under test is provided. The device under test has two ends and is mounted in a test fixture. The test fixture includes a base rigidly connectable to a first end of the device under test and a load actuator connectable to a second end of the device under test. A drive system is connected to the load actuator, and a controller is electrically connected to the drive system. A displacement sensor is connected to the drive system, and a load sensor is connected to the first end of the device under test.

In another aspect of the present invention a method for controlling the oscillatory motion of a device under test is provided. The method includes the steps of determining a set of position values of the device under test, calculating an average of the values for one cycle, and determining the difference between the average and a desired value.

BRIEF DESCRIPTION OF THE DRAWINGS

FIG. 2a is a graph illustrating a method of sampling values of position;

FIG. 2b is a graph illustrating a method of sampling values of position after an increment of time; and FIG. 3 is a flow diagram illustrating the method of FIGS. 2a and 2b.

BEST MODE FOR CARRYING OUT THE INVENTION

Figure 1:
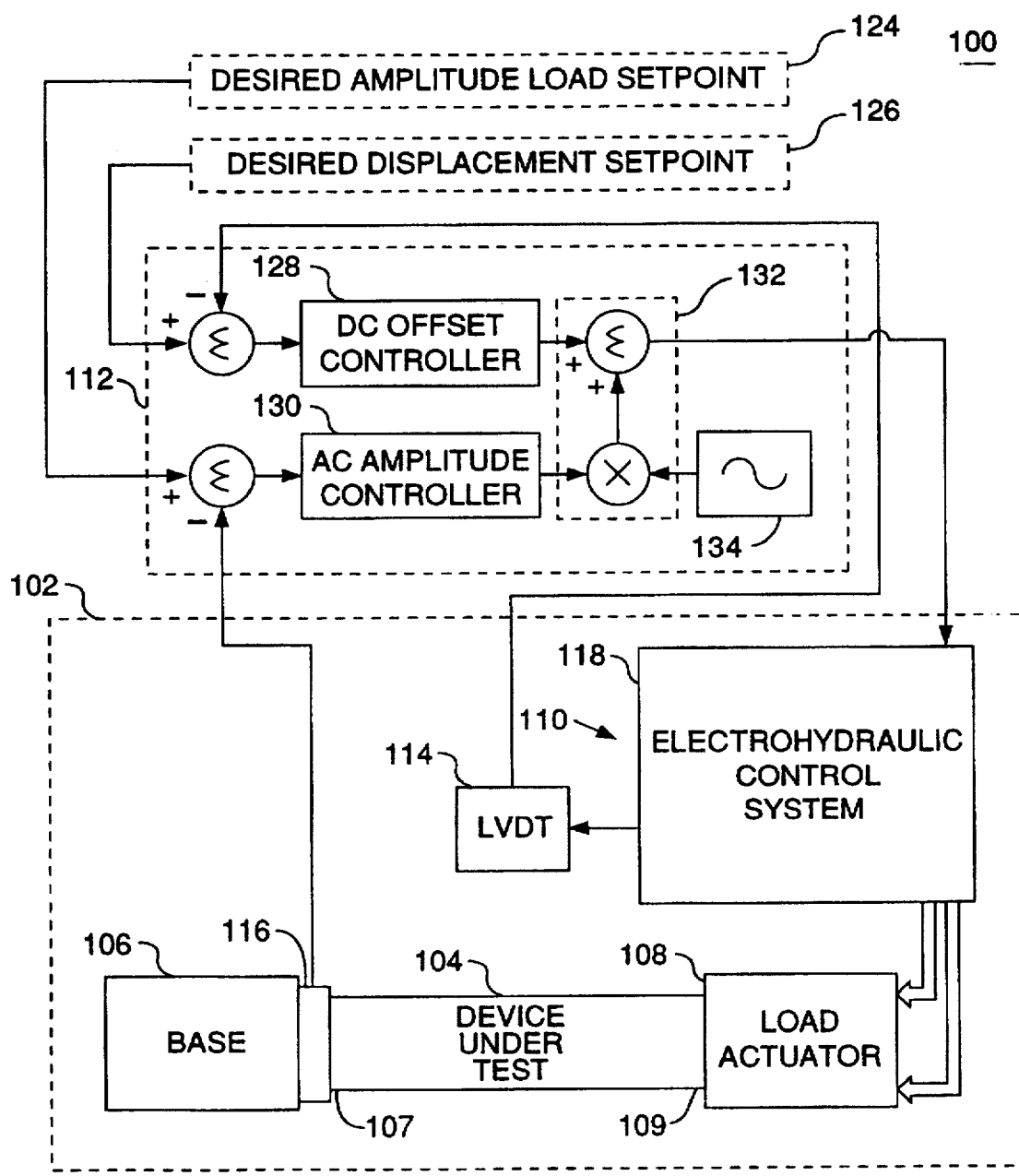
FIG. 1 is a block diagram of an apparatus according to an embodiment of the present invention.

The present invention provides a method and apparatus to control the oscillatory motion of a test device using amplitude and DC offset feedback. The present invention has many applications. For example, the oscillatory motion could be applied to twisting a shaft such as a crankshaft back and forth to test fatigue on the shaft. As another example, a device under test could be subjected to repeated compression and expansion forces to test the elasticity of the device.

With reference to FIG. 1, a block diagram of an apparatus 100 for controlling the oscillatory motion of a device under test 104 is shown. The device under test 104 has a first end 107 and a second end 109 and is mounted in a test fixture 102. The first end 107 of the device under test 104 is rigidly connectable to a base 106. The base 106 is fixed in position and does not allow the first end 107 of the device under test 104 to move.

A load actuator 108 is connectable to the second end 109 of the device under test 104. The load actuator 108 causes the second end 109 of the device under test 104 to move in a desired oscillatory manner. In the preferred embodiment, the load actuator 108 is hydraulically driven. However, other means of driving the load actuator 108 (e.g., spring/mass system, magnetic drivers) may be used.

A drive system 110 is connected to the load actuator 108. The drive system 110 provides the force needed to move the load actuator 108. Preferably, the drive system 110 includes an electrohydraulic control system 118. As one example of an electrohydraulic control system 118, a pilot valve capable of delivering a hydraulic flow of fifteen gallons per minute (GPM) drives the load actuator 108. The pilot valve is in turn driven by an electrically controlled servo valve capable of delivering a hydraulic flow of one GPM. Other examples of electrohydraulic control systems may be used without deviating from the present invention.

A controller 112 is electrically connected to the drive system 110 and delivers a control signal, preferably a sinusoidal voltage.

The controller 112 includes a sine wave generator 134 for providing a reference sinusoidal voltage. The sine wave generator 134 delivers a series of discrete voltages that define a sinusoidal waveform over time. In a first embodiment, the sine wave generator 134 includes an analog sine wave generator and an analog to digital converter (not shown). In a second embodiment, the sine wave generator 134 includes a digital sine wave generator. A more detailed description of the second embodiment of a sine wave generator 134 is discussed below with reference to FIGS. 2a and 2b.

A desired amplitude load setpoint 124 is delivered to the controller 112 and determines the desired positive peak of the sinusoidal voltage, which in turn determines the desired positive peak of the load applied to the device under test 104. In the 40 preferred embodiment, the desired amplitude load setpoint 124 is input to the controller 112 by way of a keyboard. However, alternative input means (e.g., a thumb switch) may be used.

A desired displacement setpoint 126 is delivered to the controller 112 in a manner similar to the delivery of the desired amplitude load setpoint 124. The desired displacement setpoint 126 determines the desired displacement of the DC offset of the sinusoidal voltage. Preferably, the desired displacement setpoint 126 is set equal to zero. In this embodiment, the sinusoidal waveform which drives the load actuator 108 via the drive system 110 is symmetrically equal and balanced on both sides of the zero voltage line, and therefore the device under test 104 is driven with a force that is symmetrically equal and balanced in both directions of motion.

The controller 112 includes a DC offset controller 128 and an AC amplitude controller 130. The control signals from the DC offset controller 128 and the AC amplitude controller 130 are combined with the reference sinusoidal waveform from the sine wave generator 134 in a control signal combiner 132. The combined control signal from the output of the control signal combinet 132 is delivered to the drive system 110 to drive the load actuator 108 in the desired manner.

A displacement sensor 114 is connected to the drive system 110. In the preferred embodiment, the displacement sensor 114 is a linear variable differential transformer (LVDT). However, other types of displacement sensors (e.g., laser, mechanical) may be used instead.

The displacement sensor 114 delivers a displacement feedback signal to the controller 112 which is compared to the desired displacement setpoint 126. The displacement feedback signal is then sent to the DC offset controller 128 where a DC offset signal is determined as discussed below and illustrated in FIGS. 2a and 2b. The DC offset signal is determined responsive to the oscillatory motion of an element of the drive system 110, which determines the motion of the device under test 104.

A load sensor 116 is connected to the first end 107 of the device under test 104 and is used to deliver a load amplitude feedback signal to the controller 112, where the load amplitude feedback signal is compared to the desired amplitude load setpoint 124. The load amplitude feedback signal is then sent to the AC amplitude controller 130. An example of a load sensor is a strain gauge, which is known in the art. However, other types of load sensors may be used.

Referring now to FIG. 2a, a graph of one cycle of the displacement feedback signal is shown. The DC offset controller 128 obtains values for samples of the displacement of the drive system 110 during one cycle. As an example, the DC offset controller 128 takes four hundred samples for one cycle. Other applications may require a different number of samples to be taken per cycle. The values of the samples are then averaged to determine the DC offset value.

In FIG. 2b, the displacement feedback signal has been incremented by a time period, $\Delta t$, corresponding to one sample period. To minimize the calculation time required, the oldest sample (from time 0 to time $\Delta t$) is dropped and the newest sample (from time t to time t+$\Delta t$) is added. A new DC offset value is determined simply by calculating the difference between the oldest and newest samples, since the remaining samples in the cycle have not changed. This process is repeated for subsequent $\Delta t$ increments.

The time intervals of the oldest and newest samples must correspond to the same points on subsequent cycles of the reference waveform for all increments of time and for any frequencies chosen during the test. This requires that the samples must be taken at the same points of time each cycle, which means that the distribution of samples (e.g., four hundred samples as an example) must be distributed evenly in each cycle regardless of the frequency chosen.

In the second embodiment of a sine wave generator, this problem is resolved by using the controller 112 to generate the reference sine wave by creating the sample points that define the waveform. The controller 112 uses an eight MHz clock as a counter. If the desired frequency of the waveform is determined, then the number of counts required between sample points is calculated from the following equation.

$$\text{Counts} = \frac{8 \times 10^6}{\text{Frequency} \times \text{Samples\_Pre\_Cycle}} \quad \text{Equation 1}$$

As an example, to generate a sine wave at 20.00 Hz with four hundred sample points per cycle, one thousand counts of the eight MHz counter are required between samples. The time between samples, $\Delta t$, is determined by dividing the number of counts by the counter frequency. In this example, $\Delta t$ is one thousand divided by eight MHz, which is $1.25 \times 10^{-4}$ seconds.

In the above example, each time the counter counts to one thousand, the value of the sample at that point in time is determined by the following equation.

$$\text{Sine\_Wave\_Value}_i = \sin(2\pi f^{TM} t) \quad \text{Equation 2}$$

where i is a counter increment (e.g., from 0 to 399), f is the frequency of the waveform, and $2\pi$ defines the cycle in radians.

As another example, to generate a sine wave at 20.1 Hz, Equation 1 determines the number of counts between samples to be 995.0248. In order to distribute the samples evenly and consistently in each cycle, the number of counts must be an integer value. By choosing the closest integer in the above count to be 995, a new frequency of 20.1005 is determined from Equation 1. The controller 112 will only generate reference sine wave frequencies that use integer counts between samples.

Industrial Applicability

The method of determining the DC offset to control the displacement of a device under test 104 is described in the flow diagram illustrated in FIG. 3.

In a first control block 302 the initial values of displacement for a predetermined number of samples during one cycle from a time 0 to a time t are measured. The values of the samples are then averaged in a second control block 304. This average is the DC offset for the cycle. In a third control block 306 the DC offset that is calculated in the second control block 304 is compared to a desired DC offset, as defined by the desired displacement setpoint 126.

If the calculated DC offset has a value different than the desired DC offset, then the DC offset controller 128 modifies the control signal that is delivered to the drive system 110 in a fourth control block 308. The modified control signal alters the force applied to the load actuator 108 to cause the device under test 104 to move in a more desired manner.

In a fifth control block 310 the time period of the cycle is incremented by time $^{TM}t$. In a sixth control block 312 the oldest stored sample in the cycle (e.g., from a time 0 to a time 0+$^{TM}t$) is deleted from the list of samples. The newest determined sample (e.g., from a time t to a time t+$^{TM}t$) is added to the list of samples in a seventh control block 314.

A new average for the sample values is calculated in an eighth control block 316. Since the only values of samples that have changed are for the oldest sample and the newest sample, the new average is calculated by determining the difference between the values of the oldest and newest samples. By using this method, the time required to calculate the new average of the values of the samples is minimized.

In a ninth control block 318 a new difference between the new average of the values of the samples, which is the new DC offset of the cycle from time $0+^{TM}t$ to time $t+^{TM}t$, is compared to the desired DC offset to determine the difference between them. Control then returns to the fourth control block 308 where the applied load is modified again as is described above. The process is repeated for a new increment of time $^{TM}t$.

Other aspects, objects, and features of the present invention can be obtained from a study of the drawings, the disclosure, and the appended claims.

I claim:

1. An apparatus for controlling the oscillatory motion of a device under test, the device having a first end and a second end, and being mounted in a test fixture, comprising:
   a base rigidly connectable to said first end of said device under test;
   a load actuator connectable to said second end of said device under test;
   a drive system connected to said load actuator;
   a controller electrically connected to said drive system;
   a displacement sensor connected to said drive system, said displacement sensor being adapted for delivering a displacement feedback signal to said controller; and
   a load sensor connected to said first end of said device under test, said load sensor being adapted for delivering a load amplitude feedback signal to said controller.

2. An apparatus, as set forth in claim 1, wherein said displacement feedback signal includes a DC offset signal responsive to the oscillatory motion of said test fixture.

3. An apparatus, as set forth in claim 1, wherein said displacement sensor includes an LVDT.

4. An apparatus, as set forth in claim 1, wherein said drive system comprises an electrohydraulic control system.

5. An apparatus, as set forth in claim 1, wherein said controller is responsive to a predetermined desired amplitude load setpoint and a predetermined desired displacement setpoint.

6. An apparatus, as set forth in claim 5, wherein said controller includes a reference sinusoidal signal received from a sine wave generator.

7. An apparatus, as set forth in claim 6, wherein said sine wave generator is a digital sine wave generator, said digital sine wave generator being adapted to deliver a predetermined number of sample points at a predetermined frequency.

8. An apparatus, as set forth in claim 6, wherein said controller includes a DC offset controller and an AC amplitude controller.

9. An apparatus, as set forth in claim 8, wherein said controller includes a control signal combinet, said control signal combinet being adapted to deliver a combined control signal from said reference sinusoidal signal, said DC offset controller and said AC amplitude controller.

10. A method for controlling the oscillatory motion of a device under test, including the steps of:
    determining a set of values of position samples of said device under test;
    calculating an average of said values for one cycle for a period of time from a time=0 to a time=t;
    determining a difference between said average and a desired value; and
    controlling an applied force to said device under test responsive to said difference.

11. A method, as set forth in claim 10, further including the steps of:
    determining a new set of values of position samples of said device under test;
    calculating a new average of said values for one cycle;
    determining a new difference between said new average and said desired value; and
    controlling said applied force to said device under test responsive to said new difference.

12. A method, as set forth in claim wherein determining said new set of values includes the steps of:
    incrementally adding a new value of a position sample determined at a time=t+$\Delta$t; and
    incrementally deleting an old value of a position sample determined at a time=0+$\Delta$t.

13. A method, as set forth in claim 12, wherein calculating a new average includes the step of calculating said new average of said values for one cycle for a new period of time from said time=0+$\Delta$t to said time=t+$\Delta$t.

14. A method, as set forth in claim 10, wherein controlling said applied force includes the steps of:
    establishing a desired amplitude load setpoint and a desired displacement setpoint;
    determining a maximum load value and a maximum displacement value for said one cycle;
    comparing said maximum load value and said maximum displacement value to said desired amplitude load setpoint and said desired displacement setpoint, respectively; and
    controlling said applied force responsive to a difference between said maximum load value and said desired amplitude load setpoint and a difference between said maximum displacement value and said desired displacement setpoint.

15. An apparatus for controlling the oscillatory motion of a device under test, the device having a first end and a second end, and being mounted in a test fixture, comprising:
    a base rigidly connectable to said first end of said device under test;
    a load actuator connectable to said second end of said device under test;
    an electrohydraulic control system connected to said load actuator;
    a controller electrically connected to said electrohydraulic control system;
    a displacement sensor connected to said electrohydraulic control system, said displacement sensor being adapted for delivering a displacement feedback signal to said controller; and
    a load sensor connected to said first end of said device under test, said load sensor being adapted for delivering a load amplitude feedback signal to said controller.

* * * * *

UNITED STATES PATENT AND TRADEMARK OFFICE
CERTIFICATE OF CORRECTION

PATENT NO. : 5,703,446
DATED : 12/30/97
INVENTOR(S) : Doan

It is certified that error appears in the above-identified patent and that said Letters Patent is hereby corrected as shown below:

Column 5, line 55, delete "combinet" and insert --combiner--
Column 5, line 56, delete "combinet" and insert --combiner--
Column 6, line 17, after "claim", insert --11--

Signed and Sealed this

Tenth Day of March, 1998

Attest:

BRUCE LEHMAN

*Attesting Officer*  *Commissioner of Patents and Trademarks*